(12) United States Patent
Oguchi

(10) Patent No.: US 10,627,068 B2
(45) Date of Patent: Apr. 21, 2020

(54) HEADLIGHT DEVICE FOR SADDLED VEHICLE

(71) Applicant: HONDA MOTOR CO., LTD., Minato-ku, Tokyo (JP)

(72) Inventor: Tsuyoshi Oguchi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 16/088,651

(22) PCT Filed: Feb. 7, 2017

(86) PCT No.: PCT/JP2017/004457
§ 371 (c)(1),
(2) Date: Sep. 26, 2018

(87) PCT Pub. No.: WO2017/169142
PCT Pub. Date: May 10, 2017

(65) Prior Publication Data
US 2020/0003386 A1  Jan. 2, 2020

(30) Foreign Application Priority Data

Mar. 30, 2016  (JP) .................................. 2016-069440

(51) Int. Cl.
*F21S 41/36* (2018.01)
*F21S 41/33* (2018.01)
(Continued)

(52) U.S. Cl.
CPC ................ *F21S 41/36* (2018.01); *B60Q 1/14* (2013.01); *B62J 6/02* (2013.01); *F21S 41/148* (2018.01);
(Continued)

(58) Field of Classification Search
CPC ........ F21S 41/36; F21S 41/336; F21S 41/148; F21S 41/50; B60Q 1/14; B60Q 2300/056; B62J 6/02; F21Y 2115/10; F21W 2107/17
See application file for complete search history.

(56) References Cited

U.S. PATENT DOCUMENTS 9,688,332 B2 *  6/2017  Hayashi ............... B60Q 1/0094
2011/0085343 A1 *  4/2011  Ohno ...................... F21S 41/24
362/510
(Continued)

FOREIGN PATENT DOCUMENTS

CN  104006341 A  8/2014
EP  0842817 A2  5/1998
(Continued)

OTHER PUBLICATIONS

Office Action issued in the corresponding Taiwanese Patent Application 106109320 received Apr. 24, 2018.
(Continued)

*Primary Examiner* — Mary Ellen Bowman
(74) *Attorney, Agent, or Firm* — Carter Blackman & Associates, P.C.; William D. Blackman; Joseph P. Carrier

(57) ABSTRACT

A headlight device for a saddled vehicle includes an LED light source and a mechanism which enlarges an illumination range upward in a turning direction at the time of turning traveling. The mechanism includes, at a position on an outer side, in the vehicle width direction, of a high-beam reflector that reflects forward emitted light from a high-beam, an outer reflection section that reflects the emitted light further upward than the direction of emission of the high-beam reflector. The outer reflection section is provided on at least one of left and right high-beam reflectors, and is configured to be covered by an extension serving as a decorative part, in front view of the vehicle body.

11 Claims, 12 Drawing Sheets

(51) Int. Cl.
*F21S 41/148* (2018.01)
*B60Q 1/14* (2006.01)
*B62J 6/02* (2020.01)
*F21Y 115/10* (2016.01)
*F21W 107/17* (2018.01)
*F21S 41/50* (2018.01)

(52) U.S. Cl.
CPC ...... *F21S 41/336* (2018.01); *B60Q 2300/056* (2013.01); *F21S 41/50* (2018.01); *F21W 2107/17* (2018.01); *F21Y 2115/10* (2016.08)

(56) References Cited

U.S. PATENT DOCUMENTS

| | | | | |
|---|---|---|---|---|
| 2013/0163263 | A1* | 6/2013 | Kouchi | B62J 6/02 362/476 |
| 2013/0188378 | A1* | 7/2013 | Yamamoto | F21V 13/04 362/512 |
| 2015/0124467 | A1* | 5/2015 | Kuriki | B62J 6/02 362/475 |
| 2016/0236743 | A1* | 8/2016 | Kheawhorm | B60Q 1/0035 |

FOREIGN PATENT DOCUMENTS

| | | |
|---|---|---|
| EP | 2669116 A2 | 12/2013 |
| EP | 2 792 584 A1 | 10/2014 |
| JP | 2003-025906 A | 1/2003 |
| JP | 4070880 B2 | 4/2008 |
| JP | 2009-238470 A | 10/2009 |
| JP | 2012-142159 A | 7/2012 |
| JP | 2012-142160 A | 7/2012 |
| JP | 2013-052701 A | 3/2013 |
| JP | 2013-052703 A | 3/2013 |
| JP | 5180573 B2 | 4/2013 |
| JP | 2014-186899 A | 10/2014 |
| JP | 2014-210443 A | 11/2014 |
| JP | 2015-065011 A | 4/2015 |
| WO | 2010/061651 A1 | 6/2010 |

OTHER PUBLICATIONS

Office Action issued in the corresponding Taiwanese Patent Application 10720346220 received Apr. 24, 2018.
PCT/ISA/210 from International Application PCT/JP2017/004457 and the English translation thereof.
Office Action dated Nov. 1, 2019 in the corresponding Chinese Patent Application 201780021703.4 with the English translation thereof.
Extended European search report dated Oct. 16, 2019 regarding the corresponding EP Application No. 17773690.7.

* cited by examiner

HEADLIGHT DEVICE FOR SADDLED VEHICLE

TECHNICAL FIELD

The present invention relates to a headlight device for a saddled vehicle, particularly to a headlight device for a saddled vehicle which is able to emit a low beam and a high beam in an arbitrarily switching manner.

BACKGROUND ART

Conventionally, in relation to light devices for vehicles, there has been known a configuration in which an illumination range of emitted light is enlarged while maintaining appearance quality of the light body.

PTL 1 discloses a combination lamp for a four-wheeled vehicle so configured that a housing having a headlight, turn signals and position lamps is covered by a single lens, in which by contrivance as to the layout of reflectors and the lens cutting, the emitted light from the turn signals located on the outer sides in regard of the vehicle width direction can be emitted not only to the outer sides in the vehicle width direction but also in the direction of the center of the vehicle body.

PRIOR ART DOCUMENT

Patent Document

[Patent Document 1]
Japanese Patent Publication No. 5180573 B

SUMMARY OF THE INVENTION

Problem to be Solved by the Invention

In recent years, the number of headlight devices using LEDs (light emitting diodes) which are high in directivity of emitted light has been increasing. However, in saddled vehicles such as two-wheeled or three-wheeled motor vehicles that keep balance by inclining or banking the vehicle body to the turning direction at the time of turning traveling, there is a problem that even if such a setting that a required illumination range can be obtained is made when the vehicle is in an upright state, the quantity of emitted light on the front side in the turning direction is liable to become insufficient at the time of turning traveling.

The technology of the Patent Document 1 relates to turn signals of a four-wheeled motor vehicles using incandescent lamps, and a configuration in which an LED is used as a light source of a headlight device and it is intended to secure a portion of illumination range required when the vehicle body is inclined or banked has not been investigated.

It is an object of the present invention to provide a headlight device for a saddled vehicle in which an LED is used as a light source and the illumination range at the time of turning traveling can be enlarged upward in the turning direction, and by which the above-mentioned problem in the related art can be solved.

Solution to Problems

To achieve the afore-mentioned object, the present invention has a first feature in a headlight device (30) for a saddled vehicle for comprising a light source (60), reflectors (42, 46) that reflect emitted light from the light source (60) toward a vehicle body front side and a decorative part (37) that covers part of the reflectors (42, 46), wherein an outer reflection section (47) that reflects the emitted light further upward than a direction of emission of the reflectors (42, 46) is provided at a position on an outer side, in regard of a vehicle width direction, of the reflectors (42, 46).

The present invention has a second feature in that the outer reflection section (47) is covered by the decorative part (37) in front view of the vehicle body.

The present invention has a third feature for comprising a low-beam portion (80) that emits a low beam with an illumination range restricted so as not to dazzle a person facing the vehicle with the emitted light and a high-beam portion (90) that emits a high beam with an unrestricted illumination range; wherein the light source (60) and the reflectors (42, 46) are each for the high beam.

The present invention has a fourth feature for in that a pair of the high-beam portions (90) are provided in the vehicle width direction, wherein the outer reflection section (47) is provided on at least one of the reflectors (42, 46) provided as a left-and-right pair in the vehicle width direction.

The present invention has a fifth feature in that the outer reflection sections (47) are provided on both of the reflectors (42, 46) provided as the left-and-right pair in the vehicle width direction, and illumination ranges (LH, RH) of the outer reflection sections (47) are in left-right asymmetry in the vehicle width direction.

The present invention has a sixth feature in that the high-beam portion (90) has a plurality of the light sources (60), and the outer reflection section (47) is provided on the reflector (46) that reflects emitted light from the light source (60) located on an outer side in regard of the vehicle width direction.

The present invention has a seventh feature in that the light source (60) corresponding to the reflector (46) provided with the outer reflection section (47) is turned ON only when a roll angle of the vehicle (1) equipped with the headlight device (30) for the saddled vehicle is equal to or greater than a predetermined value.

The present invention has an eighth feature in that the high-beam portion (90) is disposed on a lower side of the low-beam portion (80).

The present invention has a ninth feature for comprising a light source (60), reflectors (42, 46) that reflect emitted light from the light source (60) toward a vehicle body front side and a decorative part (37) that covers part of the reflectors (42, 46), wherein an inner reflection section (100) that reflects the emitted light further upward than a direction of emission of the reflectors (42, 46) is provided at a position on an inner side, in regard of a vehicle width direction, of the reflectors (42, 46).

The present invention has a tenth feature in that the light source (60) is an light emitting diode.

Effects of the Invention

According to the first feature of the present invention, an outer reflection section (47) that reflects the emitted light further upward than a direction of emission of the reflectors (42, 46) is provided at a position on an outer side, in regard of a vehicle width direction, of the reflectors (42, 46). Therefore, it is possible to emit light while supplementing the upper side of the illumination range of the reflectors, and the visibility of the road surface owing to the headlight device can be enhanced. As a result, when the vehicle body is inclined in the rolling direction during turning traveling, the range of illumination of the road surface on the front side in the turning direction is widened, and the visibility of the road surface during turning traveling can be enhanced.

According to the second feature of the present invention, the outer reflection section (47) is covered by the decorative part (37) in front view of the vehicle body. Therefore, the outer reflection section is not visible from the vehicle body front side, and the appearance quality of the headlight device can be enhanced. In addition, the outer reflection section can be provided utilizing the dead space covered by the decorative part in front view of the vehicle body.

According to the third feature of the present invention, a low-beam portion (80) that emits a low beam with an illumination range restricted so as not to dazzle a person facing the vehicle with the emitted light and a high-beam portion (90) that emits a high beam with an unrestricted illumination range are provided, and the light source (60) and the reflectors (42, 46) are each for the high beam. Therefore, in relation to the high beam which is not restricted as to the upper end of the illumination range, in contrast to the low beam which is restricted as to the upper limit of the illumination range so as not to dazzle a person facing the vehicle with the emitted light, it is possible to enlarge the upper end of the illumination range while maintaining the lower end of the illumination range.

According to the fourth feature of the present invention, a pair of the high-beam portions (90) are provided in the vehicle width direction, and the outer reflection section (47) is provided on at least one of the reflectors (42, 46) provided as a left-and-right pair in the vehicle width direction. Therefore, it is possible to enlarge upward the illumination range on the right side in regard of the vehicle width direction by the outer reflection section provided at the high-beam portion on the left side in regard of the vehicle width direction, and to enlarge upward the illumination range on the left side in regard of the vehicle width direction by the outer reflection section provided at the high-beam portion on the right side in regard of the vehicle width direction.

According to the fifth feature of the present invention, the outer reflection sections (47) are provided on both of the reflectors (42, 46) provided as the left-and-right pair in the vehicle width direction, and illumination ranges (LH, RH) of the outer reflection sections (47) are in left-right asymmetry in the vehicle width direction. Therefore, the illumination ranges on the left and right sides can be made different from each other, in accordance with road rules designating left-hand traffic or right-hand traffic. For example, in the case where left-hand traffic is designated by road rules, the illumination range on the left front side can be further enlarged leftward, whereby the visibility of the road shoulder and/or the sidewalk can be enhanced.

According to the sixth feature of the present invention, the high-beam portion (90) has a plurality of the light sources (60), and the outer reflection section (47) is provided on the reflector (46) that reflects emitted light from the light source (60) located on an outer side in regard of the vehicle width direction. Therefore, the light source or sources influenced as to illumination range thereof by the outer reflection section can be limited to part of the plurality of light sources, and the degree of freedom in layout in forming the reflectors can be enhanced.

According to the seventh feature of the present invention, the light source (60) corresponding to the reflector (46) provided with the outer reflection section (47) is turned ON only when a roll angle of the vehicle (1) equipped with the headlight device (30) for the saddle-type vehicle is equal to or greater than a predetermined value. Therefore, it is possible to enlarge the illumination range on the upper side in the turning direction by use of the outer reflection section, only in the case where the vehicle body is inclined in the rolling direction at the time of turning traveling and it is necessary to enlarge the illumination range.

According to the eighth feature of the present invention, the high-beam portion (90) is disposed on a lower side of the low-beam portion (80). Therefore, in the headlight device in which the high beam is emitted by driving both the low-beam portion and the high-beam portion, a favorable illumination range can be obtained by causing the emitted light from the low-beam portion and the emitted light from the high-beam portion to cross each other vertically, at the time of emitting the high beam.

According to the ninth feature of the present invention, the headlight device (30) for a saddle-type vehicle, comprising a light source (60), reflectors (42, 46) that reflect emitted light from the light source (60) toward a vehicle body front side and a decorative part (37) that covers part of the reflectors (42, 46), wherein an inner reflection section (100) that reflects the emitted light further upward than a direction of emission of the reflectors (42, 46) is provided at a position on an inner side, in regard of a vehicle width direction, of the reflectors (42, 46). Therefore, the inner reflection section makes it possible to emit light while supplementing the upper side of the illumination range of the reflectors, and to enhance the visibility of the road surface owing to the headlight device. As a result, particularly when the vehicle body is inclined in the rolling direction during turning traveling, the range of illumination of the road surface on the front side in the turning direction is broadened, and the visibility of the road surface during turning traveling can be enhanced.

According to the tenth feature of the present invention, the light source (60) is a light emitting diode. Therefore, it becomes possible to enlarge the illumination range upward, in relation to the LED which is high in directivity of emitted light.

MODE FOR CARRYING OUT THE INVENTION

Figure 1:
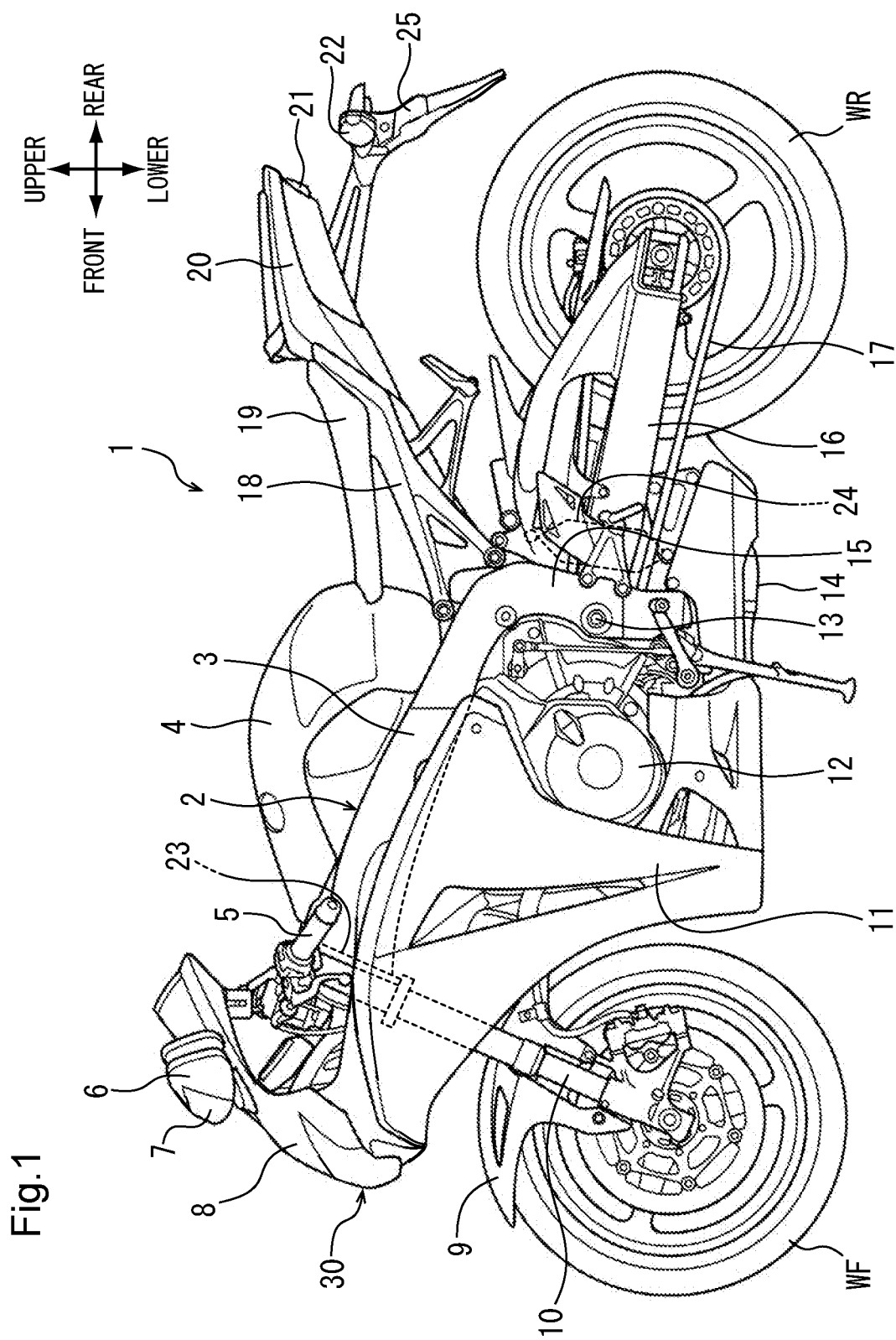
FIG. 1 is a left side view of a motorcycle to which a headlight device for a saddled vehicle has been applied.

A preferred embodiment of the present invention will be described in detail below, referring to the drawings. FIG. 1 is a left side view of a motorcycle 1 to which a headlight device for a saddled vehicle according to one embodiment of the present invention has been applied. The motorcycle 1 is a saddled vehicle that runs by transmitting a driving force of an engine 12 to a rear wheel WR. A pair of left and right front forks 10 supporting a front wheel WF in a rotatable manner are supported, in a steerable manner, by a head pipe 23 provided at a front end of a body frame 2.

A main frame 3 of the body frame 2 extends rearwardly downward from the head pipe 23, and is connected to pivot frames 15 provided with a pivot 13. A front end portion of a swing arm 16 that supports the rear wheel WR in a rotatable manner is supported by the pivot 13 in a swingable manner. The swing arm 16 is suspended from the body frame 2 by a rear cushion 24. The driving force of the engine 12 is transmitted through a drive chain 17 to the rear wheel WR.

A front cowl 8 in which a headlight device 30 according to the present invention is embedded is provided on the front side of a steering handlebar 5. Rear view mirrors 6 in which front-side turn signal devices 7 are embedded are attached on the upper side of the headlight device 30. A pair of left and right side cowls 11 are connected to lower portions of the front cowl 8. A fuel tank 4 is disposed at an upper portion of the main frame 3.

A rear frame 18 extending toward a vehicle body rear upper side is attached between the main frame 3 and the pivot frames 15. A seat 19 and a seat cowl 20 are attached to the rear frame 18. A rear fender 25 that supports a tail lamp device 21, rear-side turn signal devices 22 and a number plate (not shown) is attached to the seat cowl 20.

Figure 2:
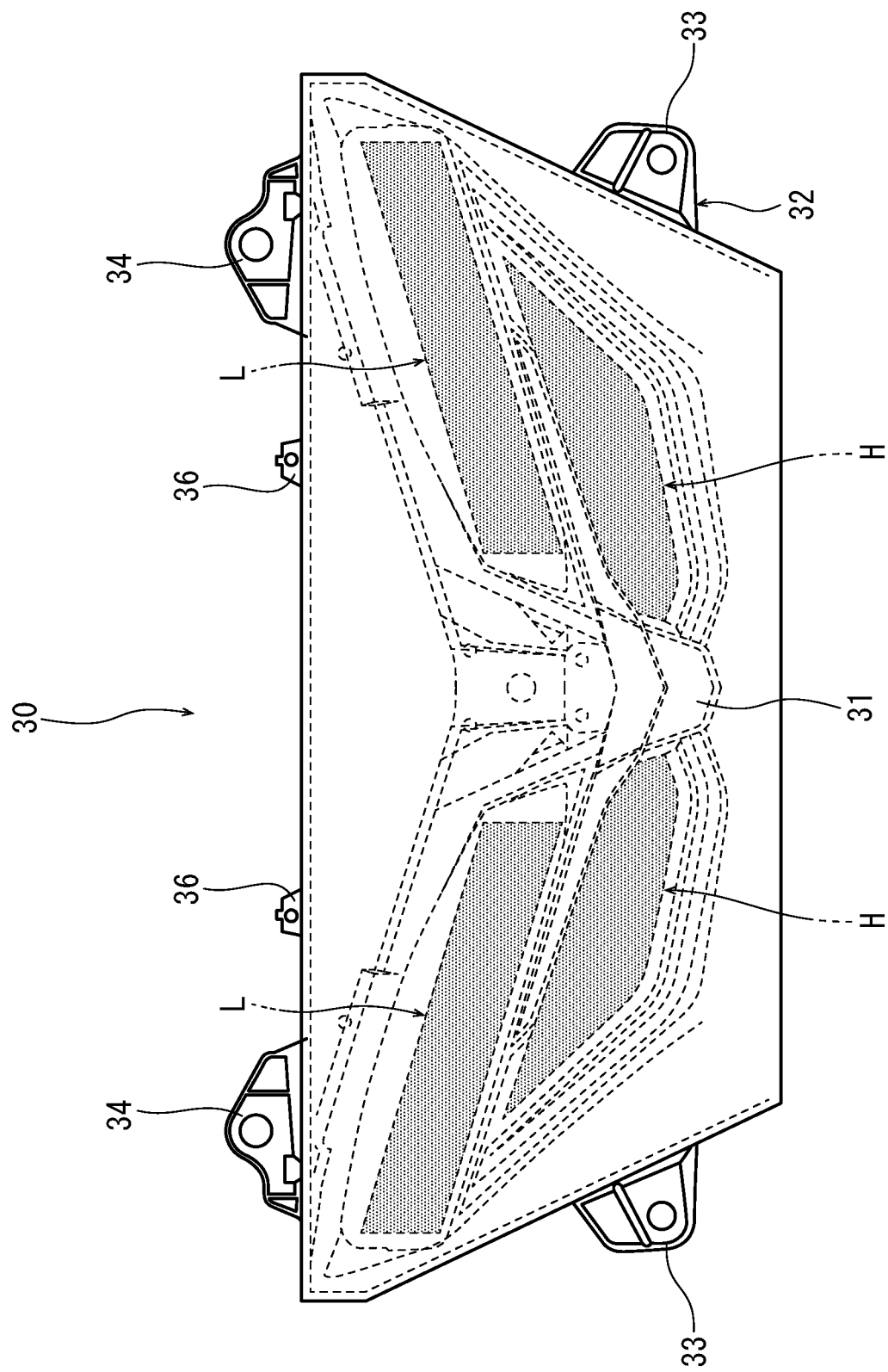
FIG. 2 is a front view of the headlight device.

FIG. 2 is a front view of the headlight device 30. The headlight device 30, which is in left-right symmetry in shape, has a pair of left and right low-beam light emission sections L (pointillistic parts) at an upper stage of a light body, and a pair of left and right high-beam light emission sections H (pointillistic parts) at a lower stage of the light body. The low-beam light emission sections L being substantially rectangular are formed to be disposed at gradually higher positions in going outward in the vehicle width direction, and the high-beam light emission sections H being elongated laterally are formed to become gradually higher in going outward in the vehicle width direction.

The headlight device 30 has a configuration in which a vehicle body front side of a housing 32 that accommodates light sources, reflectors and the like is covered with a colorless transparent lens 31. The housing 32 is fixed to the front cowl 8 by support sections 33, 34 and 36 provided on four sides.

Figure 3:
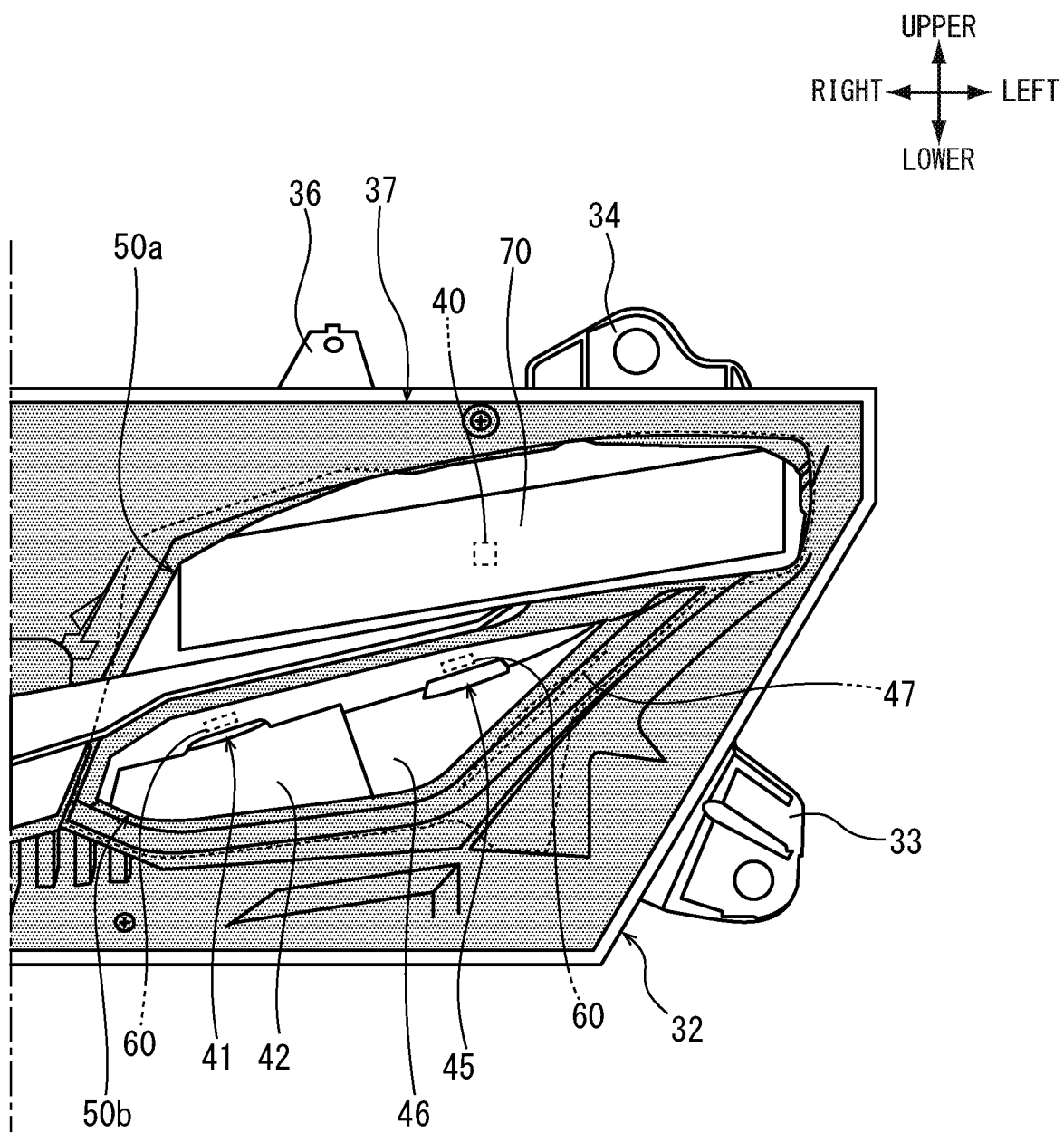
FIG. 3 is a front view of the headlight device in a state in which the lens has been detached.
Figure 4:
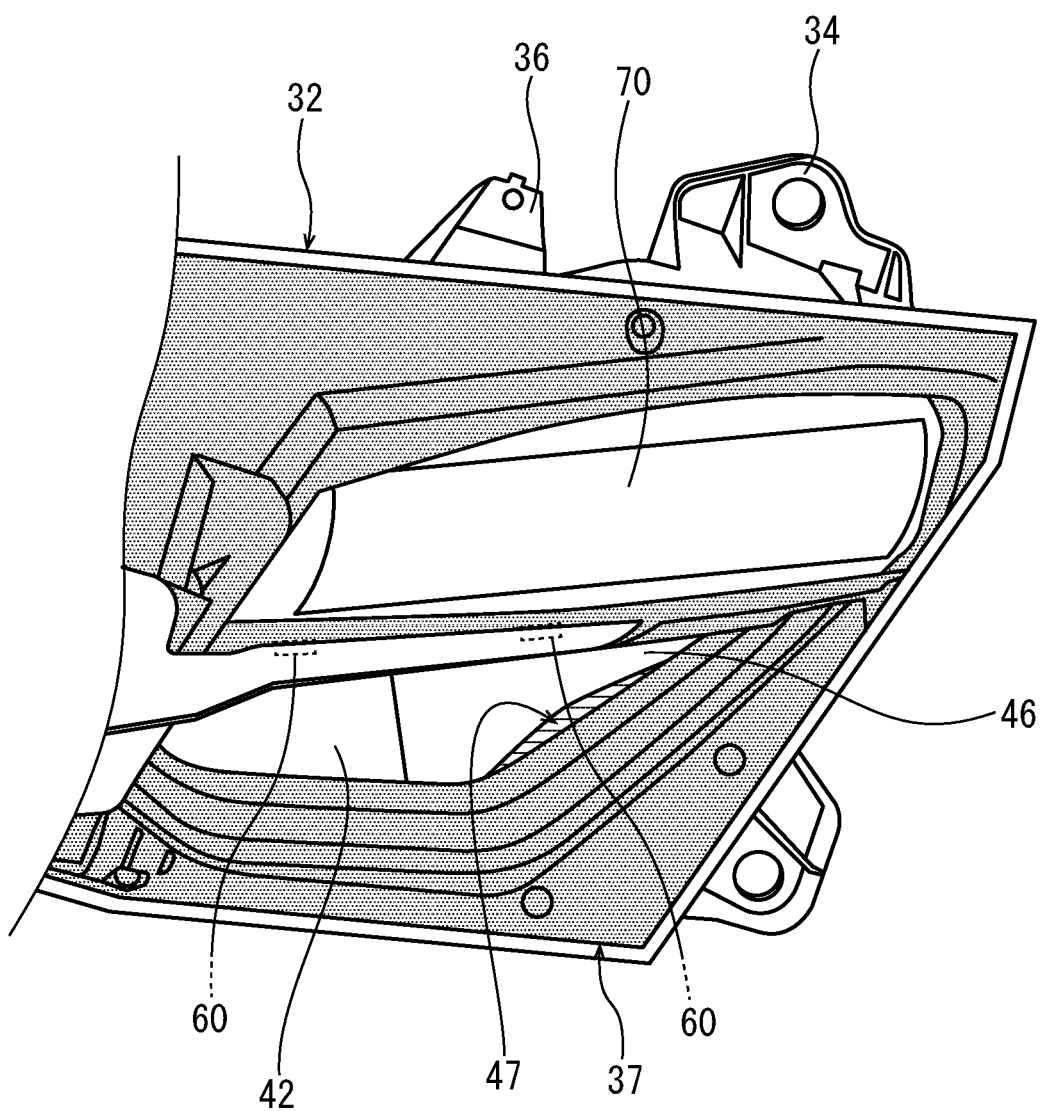
FIG. 4 is a perspective view, as viewed from a vehicle body right front side, of the headlight device in the state of FIG. 3.
Figure 5:
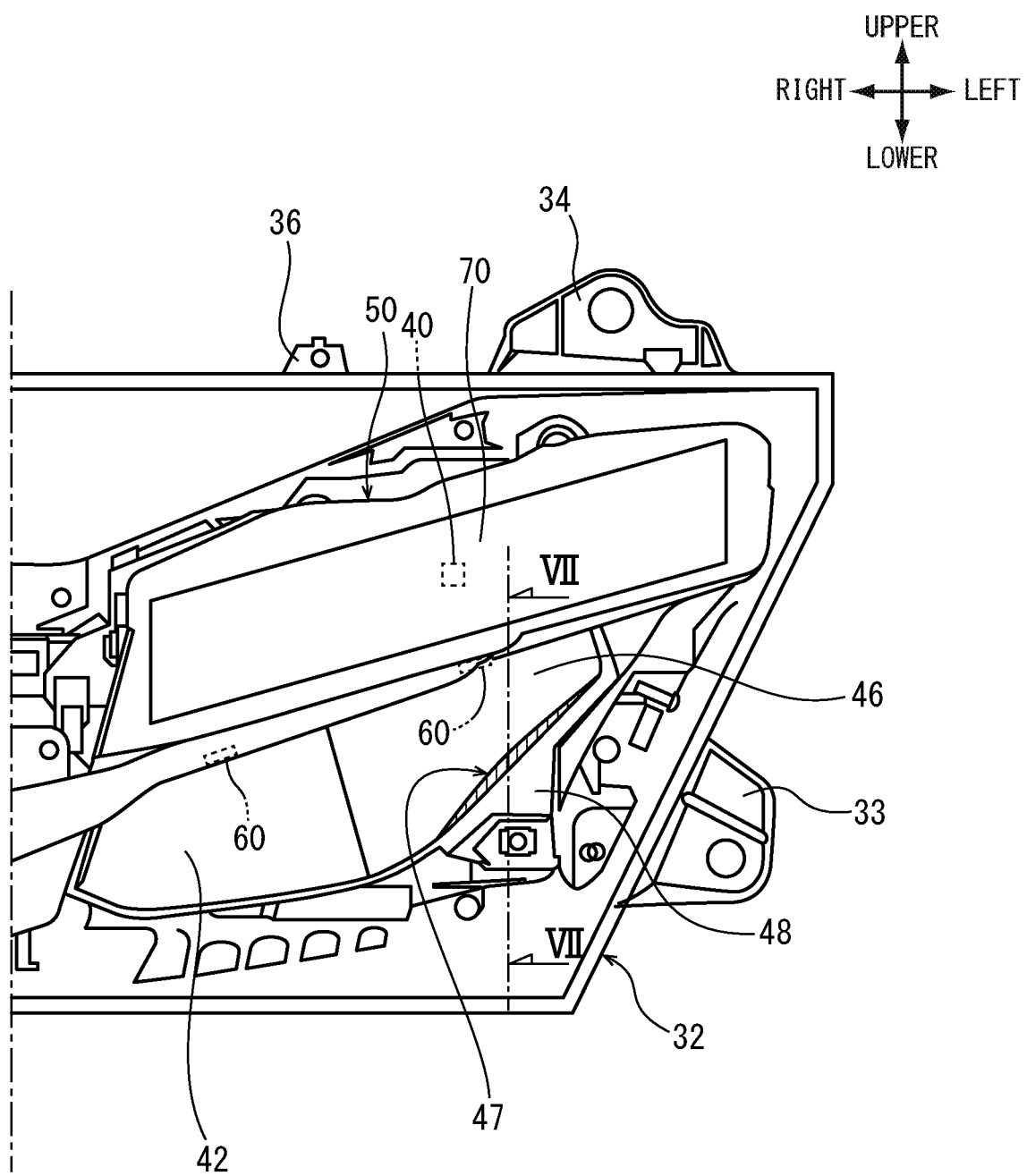
FIG. 5 is a structural illustration showing a state in which an extension has been detached from the state of FIG. 3.

FIG. 3 is a front view of the headlight device 30 in a state in which the lens 31 has been detached. In addition, FIG. 4 is a perspective view, as viewed from a vehicle body right front side, of the headlight device 30 in the state of FIG. 3, and FIG. 5 is a structural illustration (as viewed from a slightly higher position as compared to FIG. 3) showing a state in which an extension 37 has been detached from the state of FIG. 3. Since the headlight device 30 is in left-right symmetry in shape, only the left-side half thereof is shown in FIGS. 3, 4 and 5.

The headlight device 30 has a configuration in which a light support section 50 is attached on a vehicle body front side of the housing 32, the extension 37 (pointillistic part) as a decorative member is attached on a vehicle body front side of the light support section 50, and, further, the lens 31 (see FIG. 2) is attached to the housing 32 in such a manner as to cover these components.

A projector lens 70, that condenses emitted light from a low-beam LED (light source) 40 and emits it forward, is supported at an upper stage of the light support section 50. The high-beam light emission sections H include high-beam reflectors 42 and 46, having curved surfaces for reflecting emitted light from a high-beam LED (light source) 60 toward the vehicle body front side. These high-beam reflectors 42 and 46 are formed at a lower stage of the light support section 50. The high-beam reflectors 42 and 46 are provided, at upper ends thereof, with through-holes 41 and 45 for permitting the emitted light from the high-beam LED 60 to pass downwardly therethrough.

The extension 37 is formed with an upper opening 50a through which the periphery of the projector lens 70 is exposed to the vehicle body front side, and a lower opening 50b through which the high-beam reflectors 42 and 46 are exposed to the vehicle body front side.

An outer reflection section 47 according to the present embodiment is formed in continuity with the high-beam reflector 46 that is located on the outer sides in regard of the vehicle width direction. As shown in FIG. 5, the outer reflection section 47 is visible from the vehicle body front side in the state in which the extension 37 has been detached. However, since the outer reflection section 47 is located on an outer side relative to the lower opening 50b of the extension 37, it becomes invisible from the vehicle body front side when the extension 37 is attached, and therefore does not influence the appearance quality of the headlight device 30. On the other hand, even in the state in which the extension 37 is attached, the outer reflection section 47 is visible from a vehicle body right front side, as shown in FIG. 4.

Figure 6:
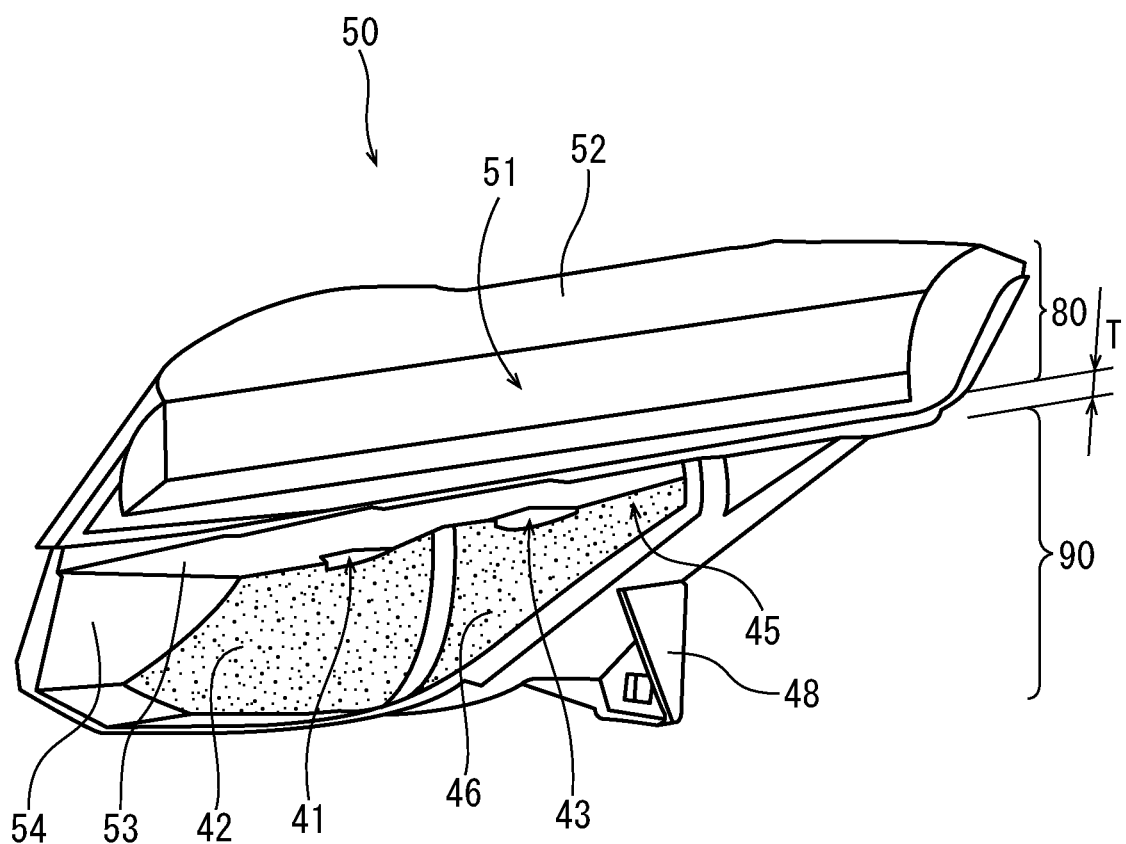
FIG. 6 is a perspective view of the light support section on the left side in regard of the vehicle width direction.

FIG. 6 is a perspective view of the light support section 50 on the left side in regard of the vehicle width direction. The light support section 50 is an integral component part formed from a colored resin or the like subjected to a reflective surface treatment by plating or metal deposition. The light support section 50 is formed, at an upper stage, with an opening 51 through which a support section 52 of the projector lens 70 and the projector lens 70 are exposed. The support section 52 is disposed in such a manner that a reflective surface is located more on the vehicle body rear side in going toward an outer side in the vehicle width direction. In addition, the high-beam reflectors 42 and 46 provided at a lower stage of the light support section 50 are each disposed in such a manner that a reflective surface is located more on the vehicle body rear side in going toward an outer side in the vehicle width direction.

A side wall 54 directed in the longitudinal vehicle direction is provided at a lateral portion of the high-beam reflector 42 on the inner side in regard of the vehicle width direction. Besides, the light support section 50 is attached to the housing 32 by use of an attachment stay 48 or the like.

In the headlight device 30 according to the present embodiment, a low-beam portion 80 for emitting a low beam and a high-beam portion 90 for emitting a high beam are formed integrally. This makes it possible not only to reduce manufacturing cost, but also to minimize a gap T between the low-beam portion 80 and the high-beam portion 90, to reduce the overall height of the headlight device 30 and to enhance the degree of freedom in vehicle body design.

Figure 7:
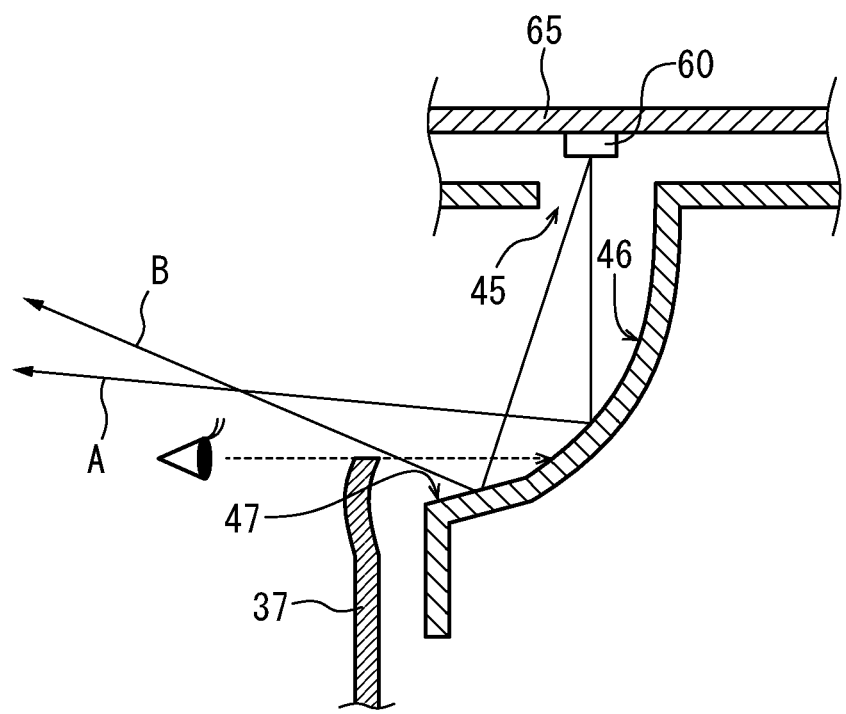
FIG. 7 is a sectional view taken along line VII-VII of FIG. 5.
Figure 8:
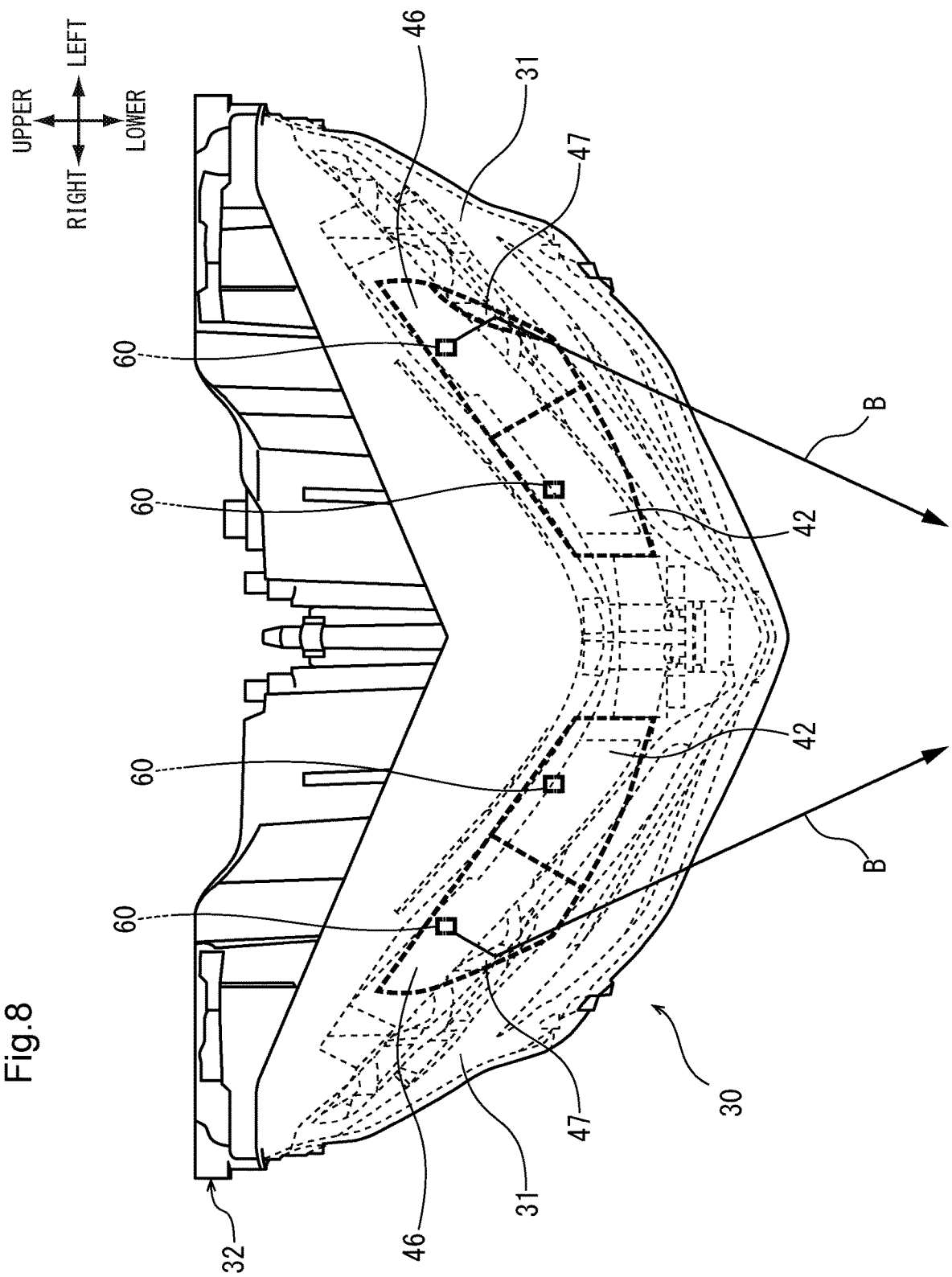
FIG. 8 is a plan view of the headlight device.

FIG. 7 is a sectional view taken along line VII-VII of FIG. 5. In addition, FIG. 8 is a plan view of the headlight device 30. As shown in FIG. 7, emitted light, from a high-beam LED 60 mounted on a substrate 65, is reflected by a main reflection section of the high-beam reflector 46 into a direction of arrow A. On the other hand, the outer reflection section 47 has an angle and a curvature set in such a manner that the emitted light from the high-beam LED 60 is reflected thereby further upward than the emitted light reflected by the high-beam reflector 46, as indicated by arrow B.

In addition, as viewed in a plan view of the vehicle body, referring to FIG. 8, the outer reflection section 47 has an angle and a curvature set in such a manner that the emitted light from the high-beam LED 60 is reflected thereby further toward the vehicle body inner side than the emitted light reflected by the high-beam reflector 46. As indicated by arrows B, the reflected lights by the outer reflection sections 47 intersect each other on the vehicle body front side. In other words, the reflected light by the outer reflection section 47 on the left side in regard of the vehicle width direction illuminates a right front side of the vehicle body, whereas the reflected light by the outer reflection section 47 on the right side in regard of the vehicle width direction illuminates a left front side of the vehicle body.

According to the above-described configuration, the outer reflection section 47 on the left side in regard of the vehicle width direction reflects the emitted light from the high-beam LED 60 further to a vehicle body right upper side than the reflected light by the high-beam reflectors 42 and 46 on the left side in regard of the vehicle width direction. On the other hand, the outer reflection section 47 on the right side in regard of the vehicle width direction reflects the emitted light from the high-beam LED 60 further to a vehicle body left upper side than the reflected light by the high-beam reflectors 42 and 46 on the right side in regard of the vehicle width direction.

Figure 9:
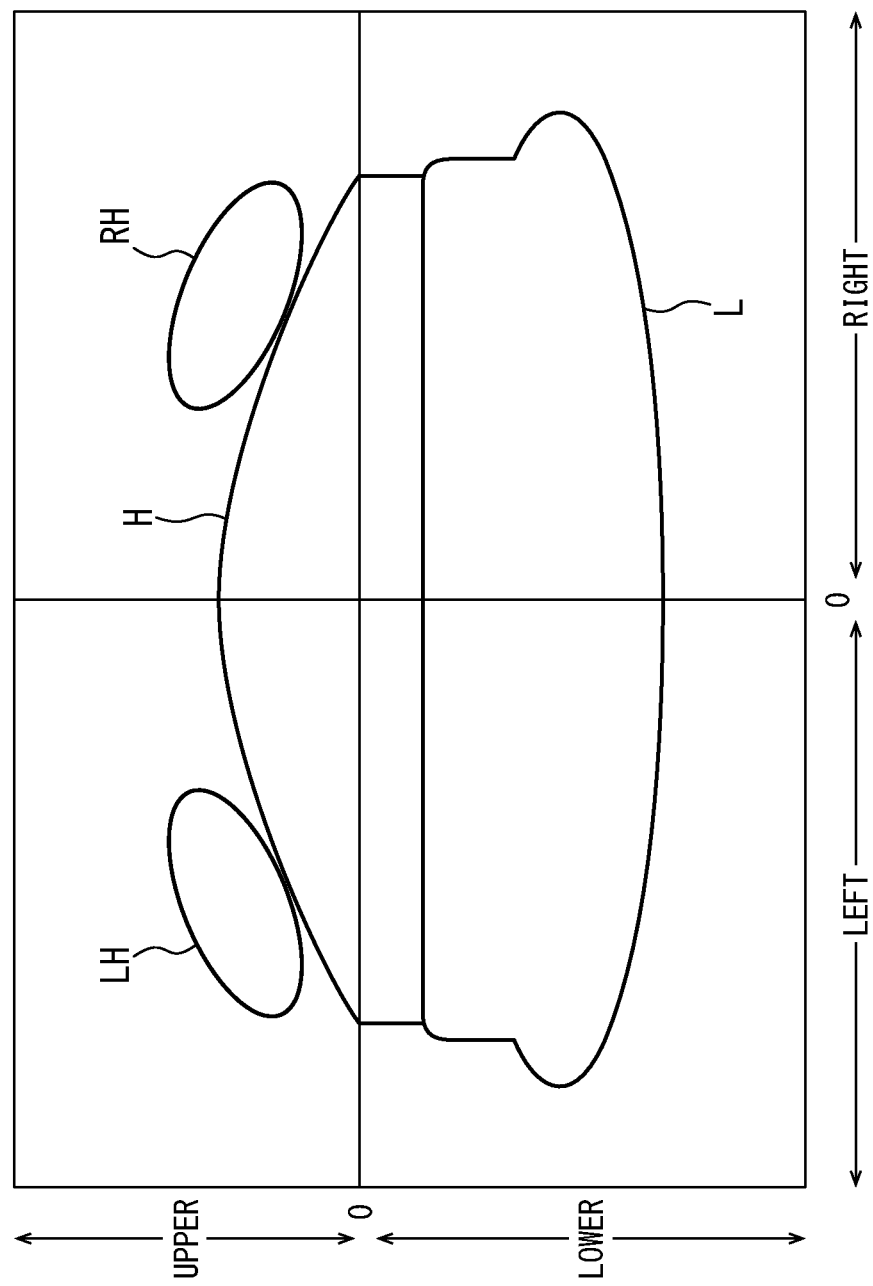
FIG. 9 is a conceptual diagram showing an illumination range of a high beam of the headlight device.
Figure 10:
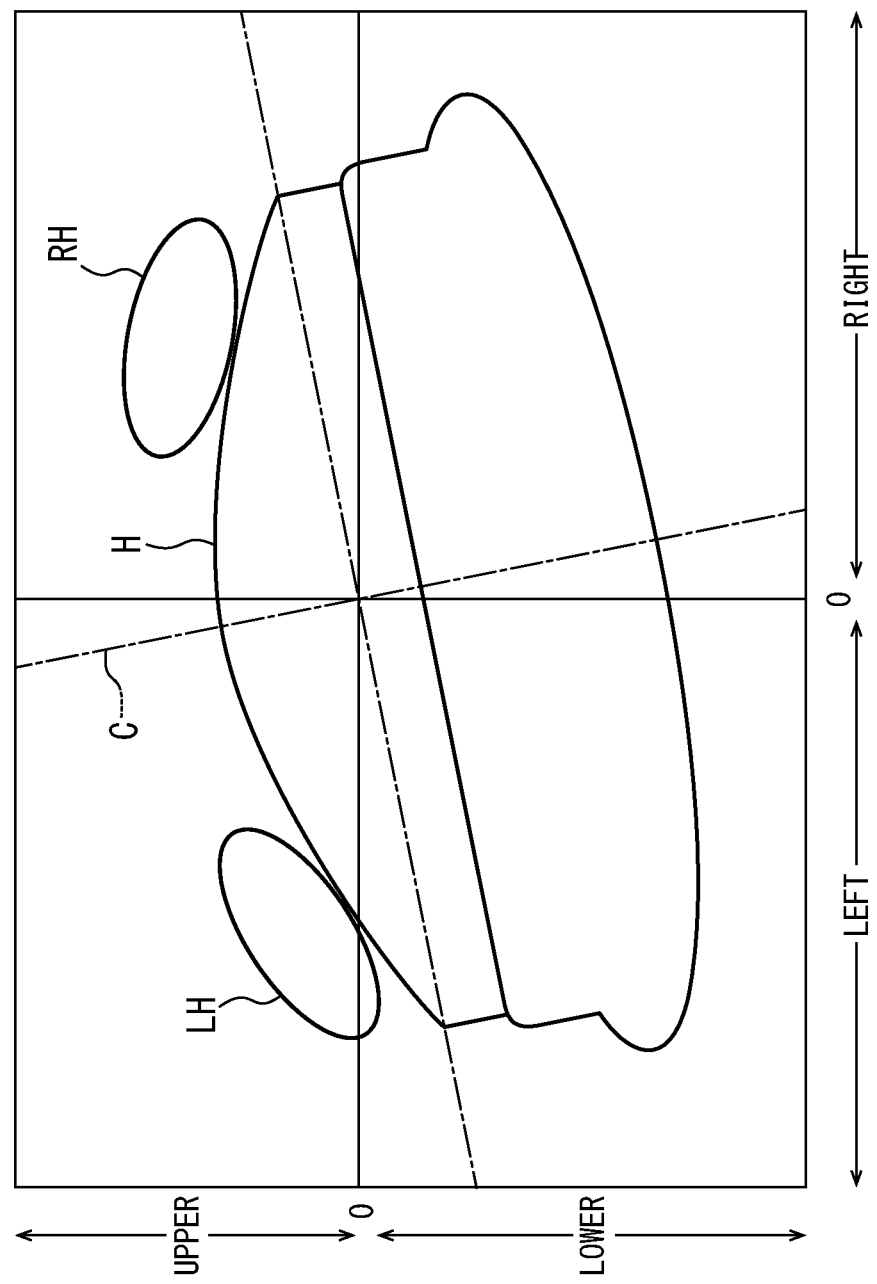
FIG. 10 is a conceptual diagram showing the illumination range of a high beam in the case where the motorcycle banks to the left.

FIG. 9 is a conceptual diagram showing an illumination range of a high beam of the headlight device 30. In addition, FIG. 10 is a conceptual diagram showing the illumination range of a high beam in the case where the motorcycle 1 banks to the left. In the headlight device 30 according to the present embodiment, the low-beam LED 40 and the high-beam LED 60 are both turned ON when the high beam is selected.

In a headlight device having light bodies on the left and right sides of a vehicle body, emitted lights from the left and right light bodies overlap with each other on the vehicle body front side, whereby a range on the vehicle body center front side becomes the brightest. In the headlight device 30 according to the present embodiment, the outer reflection sections 47 are provided, whereby an enlarged range LH on a left upper side of a high-beam range H and an enlarged range RH on a right upper side of the high-beam range H are provided, in addition a low-beam range L and the high-beam range H which are normally provided. As shown in FIG. 10, the left and right enlarged ranges LH and RH are moved toward the left or right side as a center line C in the vehicle body vertical direction of the motorcycle 1 is inclined during turning traveling.

Figure 11:
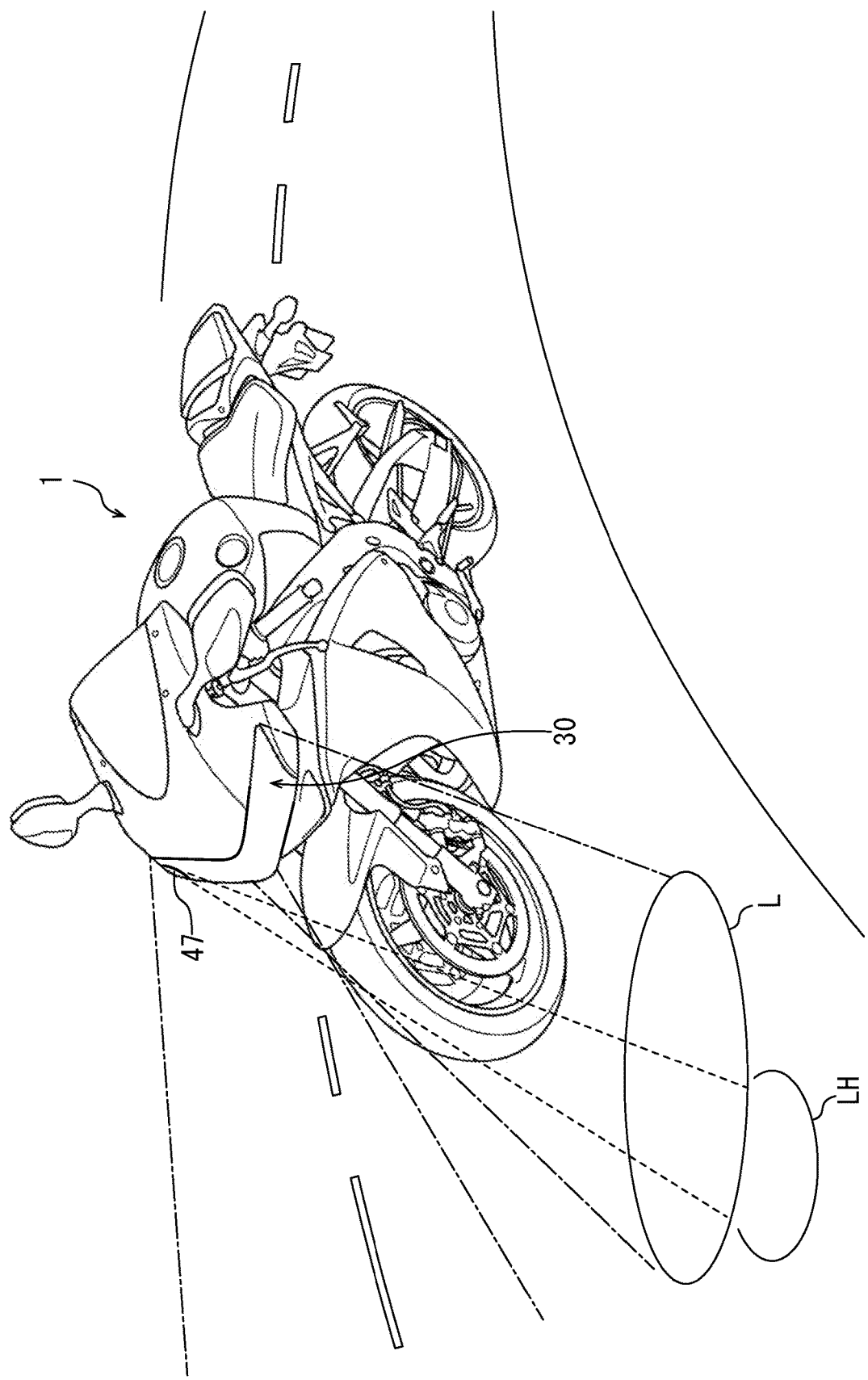
FIG. 11 is a conceptual diagram showing an illuminated state of a road surface at the time of turning traveling.

FIG. 11 is a conceptual diagram showing an illuminated state of a road surface at the time of turning traveling. As has been described above, in the motorcycle 1 that keeps balance by inclining the vehicle body to the turning direction at the time of turning traveling, even if the high beam is so set that a required illumination range can be obtained when the vehicle is in an upright state, the banking of the vehicle body at the time of turning traveling causes the illuminated range of the road surface to become closer to the vehicle, so that the road surface on the front side in the turning direction is liable to be dark.

On the other hand, in the headlight device 30 according to the present embodiment, the illumination range of the high beam is enlarged upward by the outer reflection sections 47, so that the road surface on the front side in the turning direction can be illuminated. In this figure, there is shown the manner in which the road surface on the front side in the turning direction is illuminated by the illumination range LH on the left upper side by the outer reflection section 47 on the right side in regard of the vehicle width direction, even if the vehicle body is banked to the left side due to turning to the left side.

Note that the outer reflection sections 47 may be provided on both of the light support sections 50 on the left and right sides in regard of the vehicle width direction, and, also, the outer reflection section 47 may be provided on one of the left and right sides. In addition, even in the case where the outer reflection sections 47 are provided on the left and right sides, the illumination ranges LH and RH of the outer reflection sections 47 may be set in left-right asymmetry, whereby the left and right illumination ranges can be made different, according to road rules designating left-hand traffic or right-hand traffic. For example, in the case where the road rules designate left-hand traffic, the illumination range on the left front side may be further enlarged to the left side, whereby visibility of the road shoulder and/or the sidewalk can be enhanced.

Further, it is possible to make such a setting that, based on a signal from a roll angle sensor that detects the roll angle of the motorcycle 1, the high-beam LED 60 for supplying emitted light to the outer reflection section 47 is kept OFF if the roll angle is equal to or smaller than a predetermined value even if the high beam is selected, and the high-beam LED 60 is turned ON only when the roll angle exceeds the predetermined value. This ensures that only in the case where the vehicle body banks due to turning traveling and it is necessary to enlarge the illumination range, the illumination range on the upper side in the turning direction can be enlarged by use of the outer reflection section 47.

Figure 12:
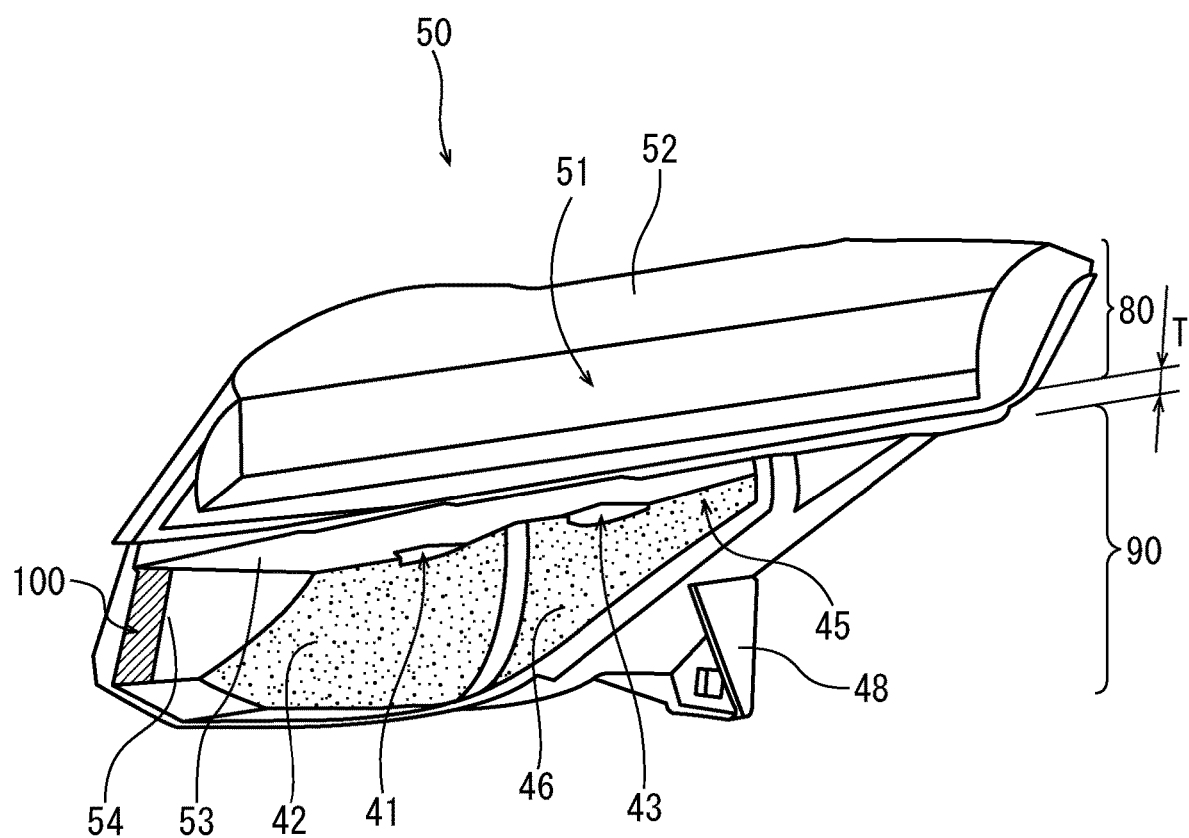
FIG. 12 is a perspective view of a light support section according to a second embodiment of the present invention.

FIG. 12 is a perspective view of a light support section 50 according to a second embodiment of the present invention. The present embodiment is characterized in that a side wall 54 provided at a lateral portion of a high-beam reflector 42 on the inner side in regard of the vehicle width direction is provided with an inner reflection section 100 that reflects emitted light from a high-beam LED 60 toward an outer upper side of the vehicle body. An outer reflection section 47 on the left side in regard of the vehicle width direction reflects the emitted light from the high-beam LED 60 further toward the vehicle body left upper side than the reflected light reflected by high-beam reflectors 42 and 46 on the left side in regard of the vehicle width direction. An outer reflection section 47 on the right side in regard of the vehicle width direction reflects the emitted light from the high-beam LED 60 further toward the vehicle body right upper side than the reflected light reflected by high-beam reflectors 42 and 46 on the right side in regard of the vehicle width direction. As a result of this, the illumination range of the high beam can be enlarged upward.

Note that the number and kinds of the light sources, the area and shape of the light emission section, the layout positions of the light sources, the presence or absence of the projector lens, the number and shape of the high-beam reflectors, etc. are not limited to those in the above-described embodiments, and can be changed variously. For example, even in a headlight device in which one light as a high-beam light source is disposed in the vehicle width direction and one light is disposed at a position offset to either of the left and right sides in the vehicle width direction, the configuration of the present invention can be obtained by providing outer reflection sections on the left and right side of the one light. In addition, the shape of the light emission section may be a horizontally elongate shape, and the light source may be an incandescent lamp or the like. Further, an outer reflection section and an inner reflection section may be provided in the vicinity of a low-beam LED, to obtain a configuration in which the illumination range of the low-beam LED is enlarged upward. The headlight device according to the present invention is applicable not only to the motorcycle, but also to a saddled three-wheeled vehicle that keeps balance by inclining the vehicle body at the time of turning traveling.

EXPLANATION OF SIGN

1 . . . motorcycle, 30 . . . headlight device, 31 . . . lens, 32 . . . housing, 37 . . . extension, 40 . . . low-beam LED, 41, 43, 45 . . . through-holes, 42, 46 . . . high-beam reflectors, 47 . . . outer reflection section, 50 . . . light support section, 60 . . . high-beam LED, 70 . . . projector lens, 80 . . . low-beam portion, 90 . . . high-beam portion, LH, RH . . . illumination range of the outer reflection sections

The invention claimed is:

1. A headlight device for a saddled vehicle, said headlight device comprising:
a light source;
a plurality of reflectors that are configured to reflect emitted light from the light source toward a vehicle body front side; and
a decorative part that covers part of the reflectors,
wherein:
the reflectors include a main reflection section configured to emit reflected light in a first direction, and an outer reflection section that is configured to emit reflected light in a second direction further upward than the first direction, and the outer reflection section is provided at a position on an outer side, in a vehicle width direction, of the main reflection section,
the headlight device comprises a low-beam portion that emits a low beam with an illumination range restricted so as not to dazzle a person facing the vehicle with the emitted light, and a high-beam portion that emits a high beam with an unrestricted illumination range,
the light source and the reflectors are each for the high beam portion,
the high-beam portion has a plurality of the light sources,
the outer reflection section is provided on one of said reflectors that reflects emitted light from the light source located on an outer side in the vehicle width direction, and
the high-beam portion is disposed below the low-beam portion, and the outer reflection section is configured such that reflected light from the outer reflection section illuminates an area forward of the vehicle body.

2. The headlight device for a saddled vehicle according to claim 1, wherein the outer reflection section is covered by the decorative part as viewed from a first vantage point in front view of the vehicle body, thereby being hidden from sight, and wherein the outer reflection section is not covered by the decorative part as viewed from a second vantage point in an outside-tilted front view of the vehicle body, thereby being able to emit reflected light outwardly from the outer reflection section.

3. The headlight device for a saddled vehicle according to claim 1, wherein a pair of the high-beam portions are provided in the vehicle width direction, and the outer reflection section is provided on at least one of the reflectors provided as a left-and-right pair in the vehicle width direction.

4. The headlight device for a saddled vehicle according to claim 3,
wherein the outer reflection sections are provided on both of the reflectors provided as the left-and-right pair in the vehicle width direction, and
illumination ranges of the outer reflection sections are in left-right asymmetry in the vehicle width direction.

5. The headlight device for a saddled vehicle according to claim 1, wherein the headlight device is configured so that the light source corresponding to the reflector provided with the outer reflection section is turned ON only when a roll angle of the vehicle equipped with the headlight device for the saddled vehicle is equal to or greater than a predetermined value.

6. The headlight device for a saddled vehicle according to claim 1, wherein the light source is a light emitting diode.

7. The headlight device for a saddled vehicle according to claim 2,
wherein a pair of the high-beam portions are provided in the vehicle width direction, and
the outer reflection section is provided on at least one of the reflectors provided as a left-and-right pair in the vehicle width direction.

8. The headlight device for a saddled vehicle according to claim 2,
wherein the outer reflection sections are provided on both of the reflectors provided as the left-and-right pair in the vehicle width direction, and
illumination ranges of the outer reflection sections are in left-right asymmetry in the vehicle width direction.

9. The headlight device for a saddled vehicle according to claim 2, wherein the headlight device is configured so that the light source corresponding to the reflector provided with the outer reflection section is turned ON only when a roll angle of the vehicle equipped with the headlight device for the saddled vehicle is equal to or greater than a predetermined value.

10. The headlight device for a saddled vehicle according to claim 2, wherein the light source is a light emitting diode.

11. A headlight device for a saddled vehicle, said headlight device including a low-beam portion that emits a low beam with an illumination range restricted so as not to dazzle a person facing the vehicle with the emitted light, and a high-beam portion that emits a high beam with an unrestricted illumination range, the high-beam portion disposed below the low-beam portion, the high-beam portion comprising:
a plurality of light sources;
a plurality of reflectors that are configured to reflect emitted light from the light sources toward a vehicle body front side; and
a decorative part that covers part of the reflectors,
wherein:
the reflectors include a main reflection section configured to emit reflected light in a first direction, and an outer reflection section that is configured to emit reflected light in a second direction further upward than the first direction,
the outer reflection section is configured to reflect emitted light from one of the light sources located on an outer side in the vehicle width direction, and
the outer reflection section is configured such that reflected light from the outer reflection section illuminates an area forward of the vehicle body.

* * * * *